United States Patent [19]
Bonnes et al.

[11] Patent Number: 5,211,669
[45] Date of Patent: May 18, 1993

[54] COMPOSITE HANDLE FOR TOOLS

[75] Inventors: David R. Bonnes, Westerville; Charles A. Seifert, Bexley, both of Ohio

[73] Assignee: The Union Fork and Hoe Company, Columbus, Ohio

[21] Appl. No.: 779,312

[22] Filed: Oct. 18, 1991

[51] Int. Cl.⁵ .............. A01B 1/01; A01B 1/22; B25G 3/02
[52] U.S. Cl. .................. 16/110 R; 294/49; 294/57; 16/DIG. 18; 264/258
[58] Field of Search ......... 16/110 R, 116 R, DIG. 18, 16/DIG. 19; 294/54.5, 49, 55.5, 57; 156/173, 180, 185, 187; 264/258, 167; 273/73 F, 73 J, 73 G, 80 B; 7/115, 167; 172/375, 378; 43/18.5

[56] References Cited

U.S. PATENT DOCUMENTS

| | | | |
|---|---|---|---|
| 2,694,661 | 11/1954 | Meyer | 156/180 |
| 3,260,010 | 7/1966 | Dubois | 264/258 |
| 3,712,659 | 1/1973 | Kneissl | 294/57 |
| 3,770,033 | 11/1973 | Gavillet et al. | |
| 4,050,727 | 9/1977 | Bonnes | |
| 4,082,277 | 4/1978 | VanAuken et al. | 156/185 |
| 4,418,732 | 12/1983 | Kolonia | |
| 4,451,073 | 5/1984 | Carmien | 16/110 R |
| 4,469,541 | 9/1984 | Goldsworthy | 264/258 |
| 4,554,705 | 11/1985 | Murray | 16/116 R |
| 4,570,988 | 2/1986 | Carmien | |
| 4,605,254 | 8/1986 | Carmien | 294/57 |
| 4,889,575 | 12/1989 | Roy | 273/80 B |
| 4,919,420 | 4/1990 | Sato | 16/DIG. 19 |

FOREIGN PATENT DOCUMENTS 732501  4/1966  Canada ............... 273/80 B

Primary Examiner—Lowell A. Larson
Assistant Examiner—Donald M. Gurley
Attorney, Agent, or Firm—Finnegan, Henderson, Farabow, Garrett & Dunner

[57] ABSTRACT

An implement handle includes an axially elongated core member having a varying cross-sectional outer dimension, and an outer polymeric shell having axially-oriented substantially-continuous strength members, the outer shell enclosing and being bonded to the core and of substantially uniform thickness. The handle may include a wood core and a bendable portion integral with the shell, the bendable portion being adapted to fit within a handle socket of a tool.

16 Claims, 6 Drawing Sheets

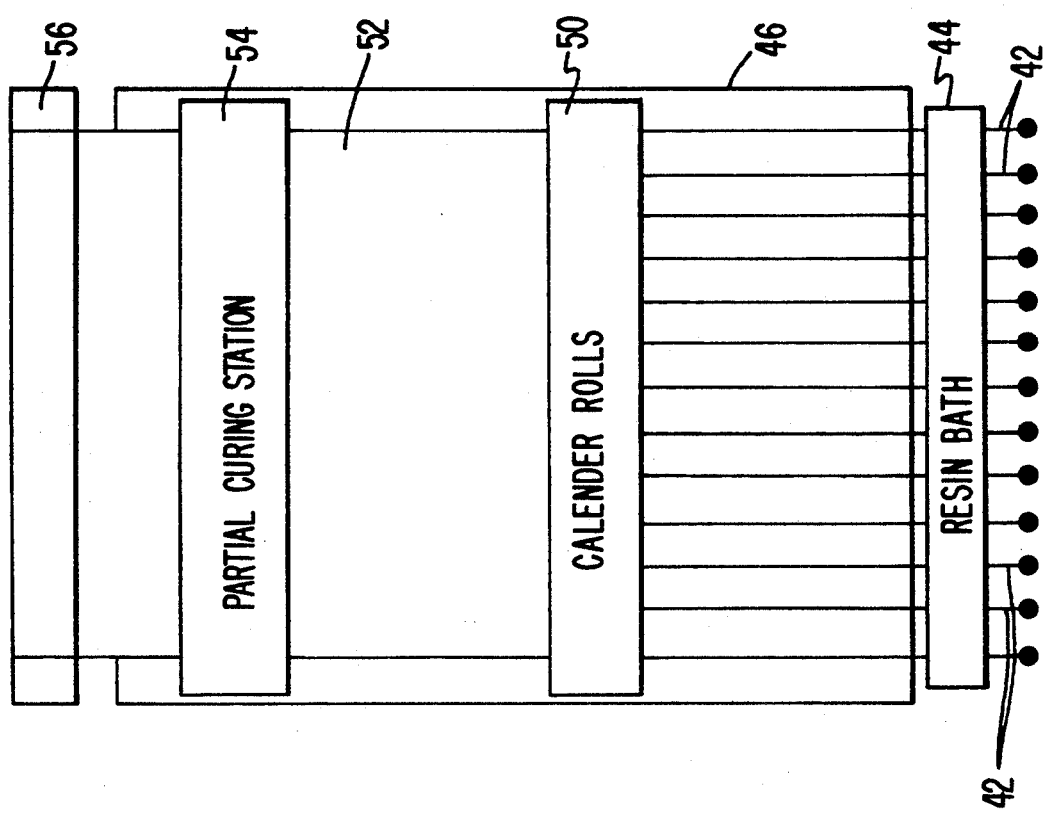
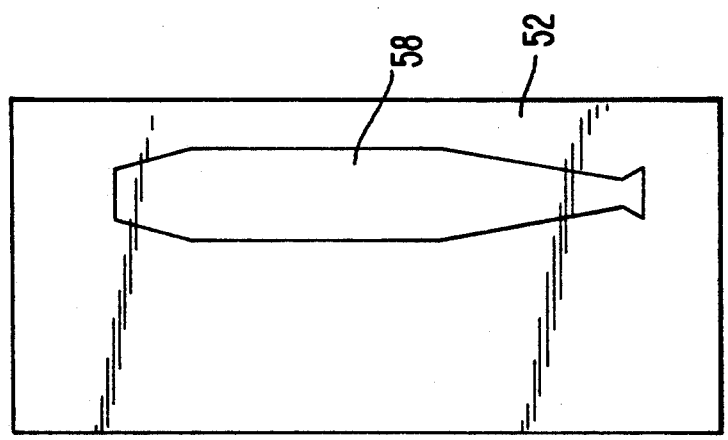

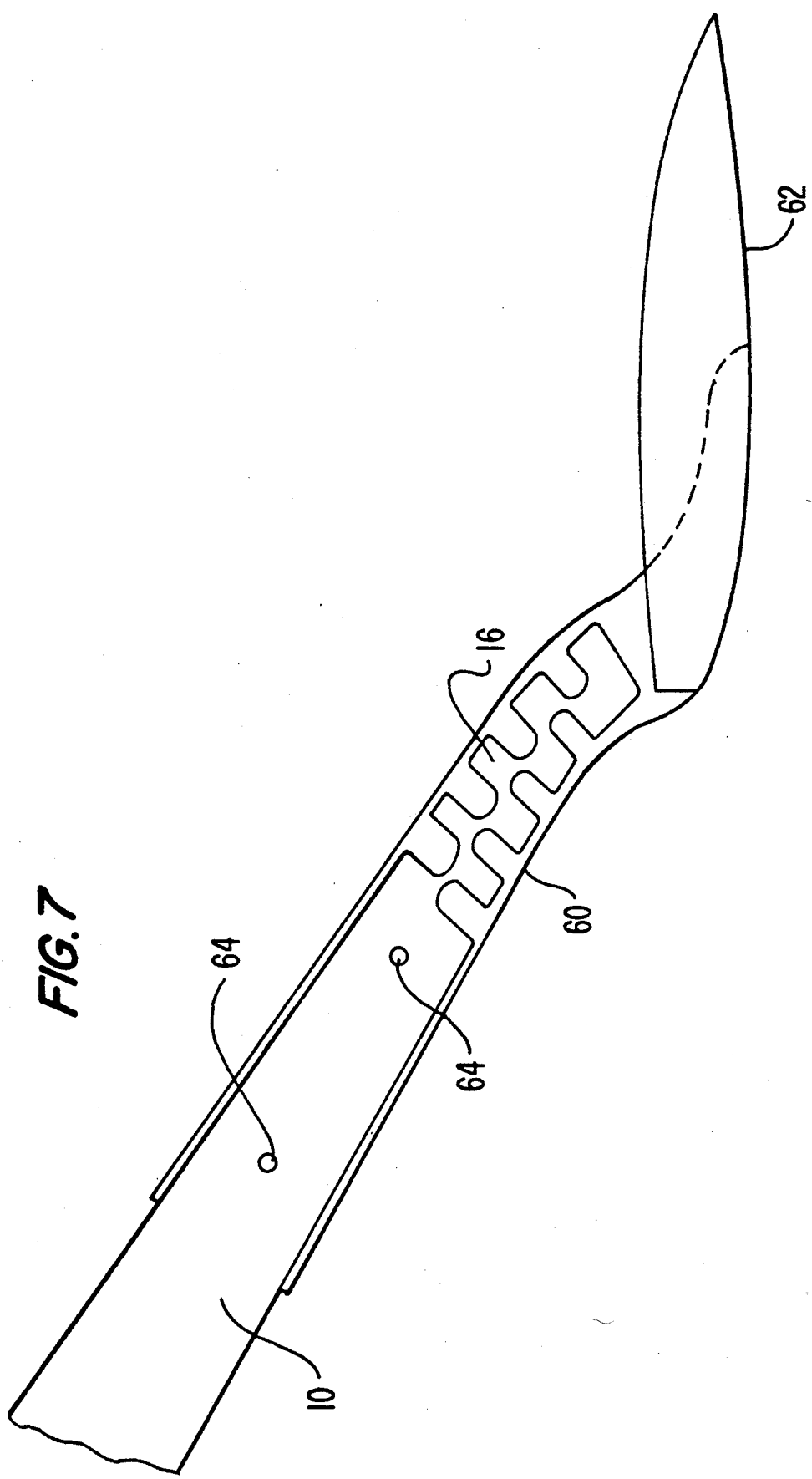

COMPOSITE HANDLE FOR TOOLS

BACKGROUND OF THE INVENTION

1. Field of the Invention

The present application relates generally to a handle for tools and, more particularly, to an improved composite handle for hardware or gardening tools.

2. Description of the Related Art

Handles for gardening and hardware tools, such as shovels, rakes, hoes, spades and forks, come in a wide variety of sizes and shapes and are manufactured from a number of materials. A vast majority of these handles are traditionally constructed entirely from wood, and while they exhibit satisfactory chemical, physical and mechanical properties in most circumstances, in other circumstances they have insufficient strength capability and do not last as long as desired when exposed to the environment.

Several approaches have been proposed for overcoming this shortcoming, including the substitution of reinforced plastic for wood. While plastic handles have been developed which in some respects out perform wood, an entirely practical plastic handle has yet to be developed. For instance, since the material selected must approximate the chemical, physical and mechanical properties of wood, only a limited number of plastics are usable for leverage-type tools such as shovels. Moreover, when plastic handles are produced, such as described in U.S. Pat. Nos. 4,418,732 and 4,639,029, they generally comprise several components which necessitate a lengthier and costlier manufacturing process. In the highly competitive garden and hand tool industry, such added costs provide a significant marketing disadvantage.

Further attempts to overcome these disadvantages have involved the use of composite materials. Composite handles generally consist of an inner core of one material surrounded by an outer shell of a different, usually plastic, material. Some known handles, for example, have a fiberglass core surrounded with a coating of injected molded thermoplastic resins, such as polyethylene or polypropylene. Handles such as these are most suited for impact-type tools, such as axes and sledgehammers, where the outer shell can absorb shock and where significant bending leverage is not applied to the tool.

Another type of composite handle is manufactured by HISCO, of Oklahoma City, Okla. This handle includes a cross-sectionally uniform wood core which is encased in a polymeric tube reinforced by glass fiber rovings. Such a tube is applied to the wood core by a pultrusion process which requires the core and finished handle to have a non-varying cross-sectional dimension. Consequently, neither the core nor the finished handle can be contoured or shaped.

It is very desirable for a tool handle to have a variable cross-section. The bending moment applied to a leverage-type tool such as a shovel is not constant throughout the entire length of the handle. Generally, it is greatest near the tool socket and lowest near the hand grip. A cross-sectional shape which has its greatest cross-sectional size near the socket and a lesser cross-sectional size near the hand grip is capable of providing a uniformly stressed member when subjected to leverage use. Thus, an uncontoured handle such as produced by HISCO requires substantially more material and larger cross-section than necessary near the hand grip portion in order for the portion near the tool to be of sufficient size to withstand the bending stress. Furthermore, it is desirable to contour the extreme end portion of the handle proximate the user to have a slightly increasing diameter so that a natural grip is formed in the handle. A constant diameter handle provides a core which is too thick to facilitate comfortable and convenient usage, and does not provide such a convenient grip.

For all these reasons, it is apparent that the prior art has not been able to supply a handle which meets the requirements for strength, weather-resistance, and contoured outer dimensions.

SUMMARY OF THE INVENTION

It is an object of the present invention to overcome the deficiencies in the prior art. It is a further object to provide a handle having improved strength and weather-resistance characteristics while also allowing shaping and contouring of the handle.

Additional objects and advantages of the invention will be set forth in the description which follows and in part will be obvious from the description, or may be learned by the practice of the invention. The objects and advantages of the invention will be realized and attained by means of the elements and combinations particularly pointed out in the appended claims.

To achieve the objects and in accordance with the purposes of the invention, as embodied and broadly described herein, the invention comprises an implement handle including an axially elongated core member having a varying cross-sectional outer dimension, and an outer polymeric shell having axially-oriented substantially-continuous strength members, the outer shell enclosing and being bonded to the core and of substantially uniform thickness.

As specifically embodied herein, the handle according to the invention may include a wood core and a bendable portion integral with the shell, the bendable portion being adapted to fit within a handle socket of a tool.

Furthermore, to achieve the objects and in accordance with the purposes of the invention, as embodied and broadly described herein, the method of manufacturing a composite implement handle comprises the steps of wrapping at least a portion of the length of an axially extending handle with at least one layer of reinforced polymeric composition including axially-oriented substantially-continuous reinforcing fibers, and compressingly molding the composition layer onto the core.

Both the handle and method of the invention overcome the deficiencies in the prior art in that, for example, they provide a handle which is contoured and which exhibits superior strength and weathering capability.

It is to be understood that both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute part of the specification, illustrate several embodiments of the invention and together with the description serve to explain the principles of the invention.

FIG. 5 depicts the process of preparing a sheet molding compound according to the invention.

FIG. 6 shows a pattern for use in the invention which is cut from sheet molding compound.

FIG. 7 shows a shovel using the invention.

DETAILED DESCRIPTION OF THE PREFERRED EMBODIMENTS

Figure 1:
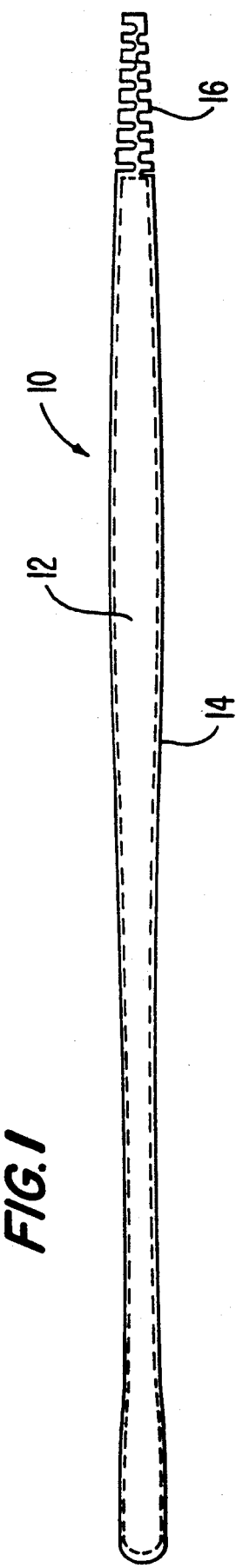
FIG. 1 shows a composite handle according to the invention.

Reference will now be made in detail to the presently preferred embodiments of the invention which are illustrated in the accompanying drawings. Wherever possible, the same reference numerals will be used throughout the drawings to refer to the same or like parts.

FIG. 1 depicts an implement handle 10 according to the invention which generally comprises a core member 12 (shown by the dashed lines), an outer shell 14 and an integral bendable tip 16.

In accordance with the invention, the implement handle includes an axially elongated core member having a varying cross-sectional outer dimension. As embodied herein, core 12 is preferably made of wood and extends the entire length of handle 10. In fact, core 12 can be made of a variety of materials so long as it can be shaped or contoured into configurations which facilitate gripping the tool as well as providing the requisite flexibility, tensile strength and impact strength needed for the particular tool.

Figure 2:
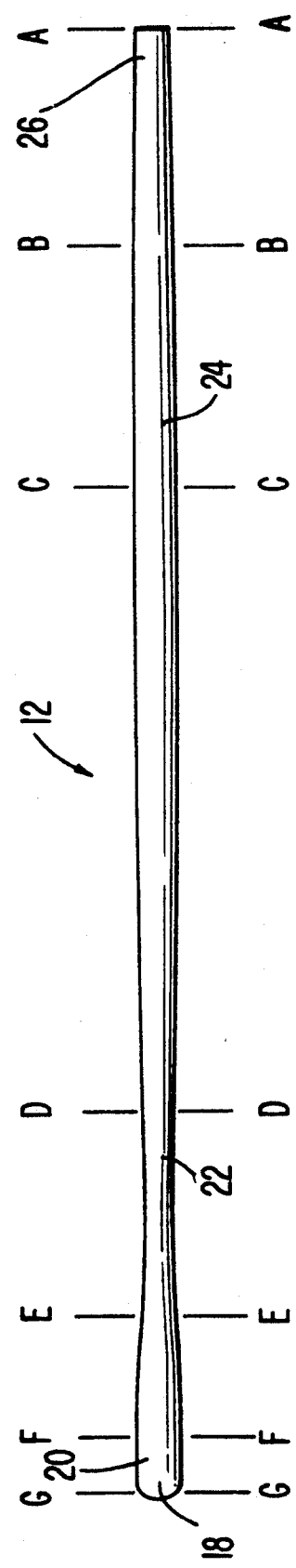
FIG. 2 shows a core section for the handle of FIG. 1.

The strength requirement of core 12, as well as the outer shell 14, may vary depending on the application (e.g., shovel or hoe) and the particular target market (e.g., low or high end). If wood is used for the core, the grain of the wood preferably runs along the length of the core. As shown in FIG. 2, core 10 is shaped with an enlarged or bulbous distal end portion 18, a first generally straight cylindrical portion 20, a gradually tapered portion 22, a second generally straight cylindrical portion 24 and a tapered shank portion 26.

A preferable wood for such a core is Northern White Ash which exhibits an excellent combination of strength and flexure. Typically, Northern White Ash stock used in shovel handles is dried to a 14% moisture content prior to turning. In the present embodiment, it is desirable to provide additional drying prior to encasing core 12 in shell 14, a 10% moisture content being desirable.

As stated above, other materials may be used as a core material. For example, a foam material has been used with good results in producing a light-weight handle. Further additional core materials can readily be envisioned, including a shaped honeycomb material.

Further in accordance with the invention, the handle includes an outer shell having axially-oriented substantially-continuous strength members, the outer shell enclosing and bonded to the core, and of substantially uniform thickness. As embodied herein and shown in FIGS. 3(a) and (b), outer shell 14 is a fiber reinforced polyester resin coating. Fibers 28 are preferably substantially continuous along the axial direction of the handle. As used herein, "substantially continuous" means that the fibers are not chopped and that they extend along a significant portion of the handle, and "substantially uniform thickness" means the shell generally follows the contour of the core, although the shell may consist of differing numbers of layers of fiber reinforced resin at differing axial positions. As embodied herein, the thickness of about 0.10 inch is preferred with a glass-reinforced polyester shell. However, the thickness may vary, for example, from 0.03 inch to 0.125 inch.

Fibers 28 of the invention may be glass, graphite, aramid or similar reinforcing fibers. However, glass is the most preferred fiber from a cost-effectiveness standpoint. The fibers are preferably wetted and imbedded with a polyester resin 30, but other polymeric resins such as silicones and phenolics can be used. As will be clear to one of ordinary skill in the art, the various types of resins and reinforcing fibers should be selected depending upon the desired chemical, mechanical and physical properties needed for the handle. Specifically, it has been discovered that a shovel having satisfactory characteristics is preferably achieved by using an outer shell which comprises 60–75% glass fibers by weight. It should further be noted that it is desirable that the resin of the outer shell bond to the wood core providing additional strength to the resulting handle.

Figure 8:
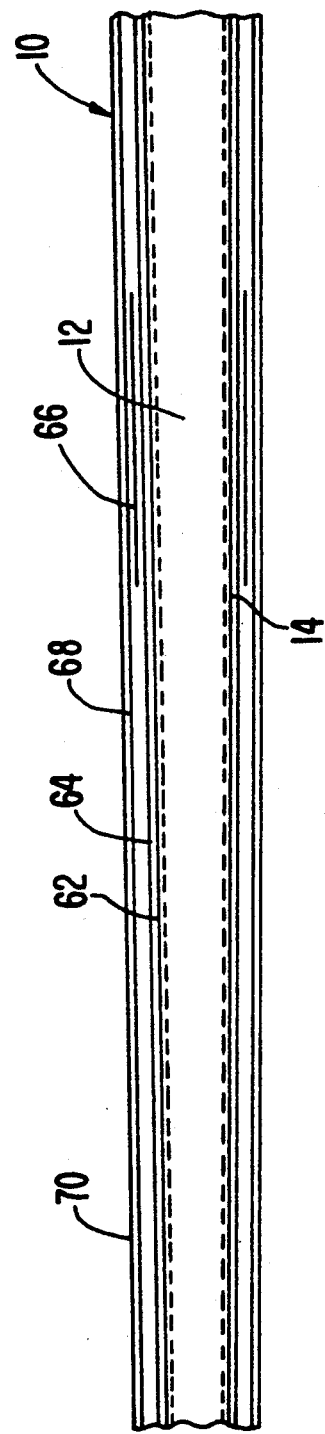
FIG. 8 schematically depicts layers of the implement handle.

Depending on cost, strength and weight requirements, the outer shell may consist of several layers including several layers of glass reinforced resin and an outer layer of polyester fabric which is also impregnated with polyester resin. If desired, the outer layer may be painted or otherwise coated (70 in FIG. 8) in order to satisfy aesthetic criteria.

Referring to FIG. 2, in a first embodiment of the invention, wood core 12 is provided having a 1.011 inch diameter at Section A—A, a 1.360 inch diameter at Section B—B, a 1.360 diameter at Section C—C, a 0.938 inch diameter at Section D—D, a 0.938 inch diameter at Section E—E, a 1.251 inch diameter at Section F—F, and a 1.251 inch diameter at Section G—G, where Section A—A is spaced 6.18 inches from Section B—B, Section B—B is spaced 6.93 inches from Section C—C, Section C—C is spaced 18.00 inches from Section D—D, Section D—D is spaced 6.00 inches from Section E—E, Section E—E is spaced 3.50 inches from Section F—F, and Section F—F is spaced 1.62 inches from Section G—G.

Figure 3A:
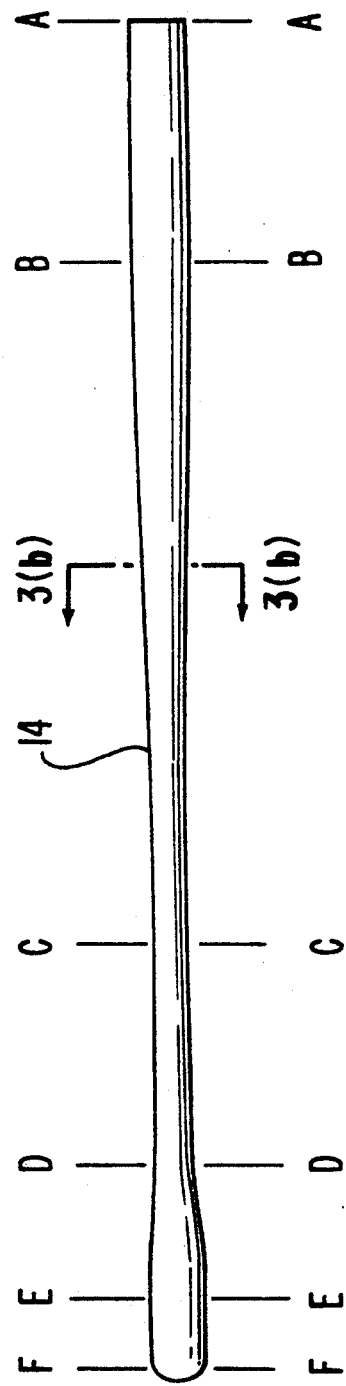
FIGS. 3(a) and (b) show two views of a handle comprising a core section and an outer shell.
Figure 3B:
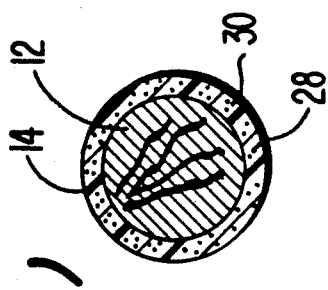

In this first embodiment, the core 12 is wrapped with two layers of fiber reinforced resin material (62 and 68 in FIG. 8) and a third layer of resin impregnated polyester fabric 68, and then is compression molded into the composite handle. Referring to FIG. 3(a), the resulting handle has a 1.50 inch diameter at Section A—A, a 1.50 inch diameter at Section B—B, a 1.078 inch diameter at Section C—C, a 1.078 inch diameter at Section D—D, a 1.391 inch diameter at Section E—E and a 1.391 inch diameter at Section F—F, where Section A—A is spaced 6.50 inches from Section B—B, Section B—B is spaced 18.00 inches from Section C—C, Section C—C is spaced 6.00 inches from Section D—D, Section D—D is spaced 3.50 inches from Section E—E, Section E—E is spaced 1.80 inches from Section F—F. This resulting shape is of course dependent upon the shape of the mold cavity used in compression molding the handle.

Referring again to FIG. 2, a second embodiment of the invention includes wood core 12 having a 0.963 inch diameter at Section A—A, a 1.312 inch diameter at Section B—B, a 1.312 inch diameter at Section C—C, a 0.890 inch diameter at Section D—D, a 0.890 inch diameter at Section E—E, a 1.203 inch diameter at Section F—F and a 1.203 inch diameter at Section G—G, where the sections are spaced as indicated above for the first embodiment. In this embodiment, three layers of fiber reinforced resin material are applied over the wood core prior to applying a fourth layer of resin impregnated polyester fabric material. The same final dimensions set out above for the first embodiment are also achievable for this embodiment.

In a third embodiment, a layer (66 in FIG. 8) of resin impregnated strength members is applied over only a limited portion of the wood core. In this embodiment, the additional layer of strength members can be applied to the handle at the area or areas of highest bending stress. In this way, the tool handle can be "tuned" to the requirements of the particular application.

As embodied herein and shown in FIG. 4(a)–(d), it is desirable to place a bendable tip 16 on the shank end of the handle and integral with shell 14. Tip 16 is designed to be insertable into the socket of a tool, such as a shovel. Tip 16 is comprised of a tapered section 32. Such a shape is able to provide a satisfactory contour and flexibility for customer use. In this embodiment, bendable tip 16 is integrally connected to the tapered portion 28 of shell 14. Although in the preferable embodiment, the bendable end portion is integral, it need not be. For instance, bendable tip 16 can be separately made from bendable plastic material.

It will be appreciated that the tubular socket for a holder of, for example, a shovel extends up to and encompasses at least a part of the tapered section and is suitably secured thereto by conventional means, such as riveting. In the preferred embodiment, the tapered section has the thickness at its maximum diameter which is sufficient for completely occupying that portion of the tool socket for which it is designed.

Figure 4A:
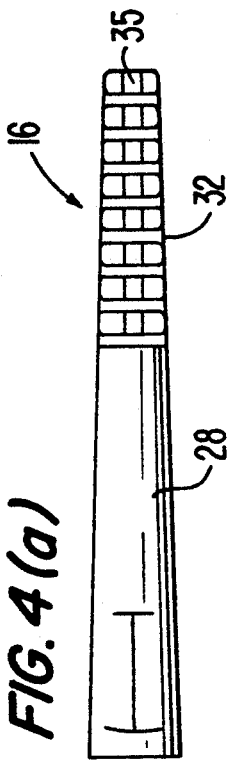
FIGS. 4(a)–(d) show a tip portion as used in the invention.
Figure 4B:
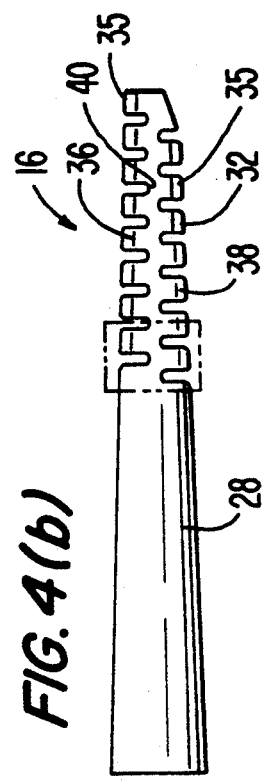
Figure 4C:
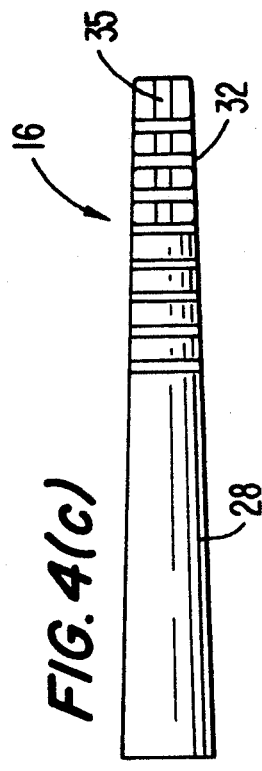
Figure 4D:
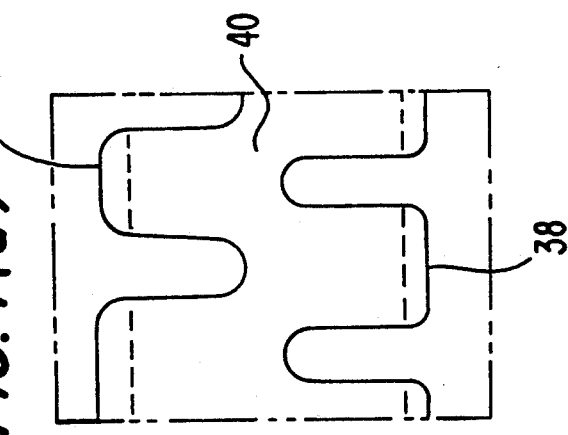

Bendable tip 16 preferably has a crenolated type configuration comprising a first 36 and second 38 series of plurality of projections spaced apart by slots, as best shown in FIG. 4(d). The projections extend in a direction away from the longitudinal axis of the tip. Each projection of the first series 36 is alternately spaced with projections of the second series 38 along the axial extent of the tip. The tip is made of resin impregnated chopped fibers and preferably has substantially-continuous strength members in the flat extended center section 40 of the tip. Because of this crenolated-type construction, tip 16 is a relatively yieldable or bendable portion which allows it to bend and conform about the plane formed by section 40 in order to fit the configuration of the tool socket during the coupling of the handle and the tool. Preferably, a groove 35 of, for example, 1/16 inch is placed in the outer surface of projections 36 and 38 to facilitate drainage.

A preferred method of making a handle according to the invention will now be described with reference to FIG. 5. Initially, a wood core section is produced by traditional methods. However, this core section is preferably dried to a moisture content of approximately 10%.

The layers of the outer shell are prepared by producing a sheet molding compound ("SMC"). Such an SMC is produced by drawing glass fibers 42 through resin bath 44 onto a flat mesh belt 46. As preferably embodied herein, 33 wt % unsaturated polyester resin, 0.8 wt % zinc sterate, 0.3 wt % t-butyl peroxy benzoate, 0.8 wt % pigment dispersion, and 1.0 wt % modifier is combined with 65 wt % continuous glass reinforcement fiber. The resultant material is passed through calender rolls 50 which press it into flat sheet 52. The sheet is exposed to an elevated temperature at curing station 54 which partially cures the resin material, which is then wound on a takeoff reel 56.

An outer veil layer is prepared using polyester fabric impregnated with resin including 55.5 wt % saturated polyester resin, 1.7 wt % zinc sterate, 0.6 wt % t-butyl peroxy benzoate, 1.7 wt % pigment dispersion, 1.0 wt % modifier, 8.3 wt % filler, and 30.0 wt % nonglass fiber reinforcement and mat.

Both the SMC and veil layers are stored approximately four weeks prior to their use. When ready for use, the sheets 52 are rolled flat and patterns 58, which will conform to core 12, are cut from the sheet, as shown in FIG. 6. Patterns 58 are then wrapped around the wood core beginning with an SMC layer. As preferably embodied herein, two or three SMC layers are wrapped around the wood core. Next, the outer veil layer is wrapped around the wood core. All of the layers are gathered and precompressed about the core.

The wrapped wood core is placed in a compression molding apparatus, as known in the art, and subject to compression molding which, as embodied herein, occurs under 400 tons of hydraulic pressure and at a curing temperature of 250°–300° F. generated using steam heat. Under these conditions, the resin reflows uniformly throughout the various layers and then cures. Furthermore, resin penetrates the outer surface of the wood and bonds outer shell 14 to the wood core 12.

A handle as described above and produced by the method of the invention can be used in various tools. FIG. 7 shows handle 10 with bendable tip 16 fitted in socket 60 of shovel 62. The handle is fixed with rivets 64. For any tool, the rigid handle should extend sufficiently far enough into the socket to transfer the desired bending force, since the bendable tip by itself cannot adequately transfer the bending force. For a typical shovel with a 48 inch long handle 10 and a 4.89 inch long tip 16, the rigid handle not including the bendable tip should extend approximately 5 inches into the socket of the shovel.

It will be apparent to those skilled in the art that various modifications and variations can be made in the handle and method of the present invention, and in construction of this handle, without departing from the scope or spirit of the invention. As an example, the handle of the invention need not be formed with a core, since it is the shell that provides the primary strength member of the handle. Methods of producing such a handle can be envisioned by those skilled in the art, such as molding using a core which decomposes during the molding process. Such a handle would be ideally suited to lightweight applications.

Other embodiments of the invention will also be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An implement handle, comprising:
   an axially elongated polymeric shell having an axial centerline and a closed and hollow cross-sectional shape of predetermined inner and outer dimensions wherein both the inner and outer dimensions vary along the axial length of the shell, said dimensional variation including several dimensional reversals comprising positive and negative changes in the inner and outer dimensions with respect to the axial centerline, whereby a complex tapered shape is formed;

substantially-continuous axially-oriented reinforcing fibers embedded in the shell; and a core member fully enclosed within said shell, the core member having outer dimensions which conform to the inner dimensions of said shell.

2. The handle as claimed in claim 1, wherein the shell is bonded to the core.

3. The handle as claimed in claim 2, wherein the core has a solid cross-section.

4. The handle as claimed in claim 3, wherein the core is wood.

5. The handle as claimed in claim 1, wherein the core is foam.

6. The handle as claimed in claim 1, wherein the core is a honeycomb structure.

7. The handle as claimed in claim 1, wherein the cross-section of the shell is substantially circular.

8. The handle as claimed in claim 2, wherein the shell comprises:

at least one layer of resin-impregnated fiber-reinforced material extending along at least a portion of the length of the handle; and a veil layer including resin-impregnated fabric, an outer surface of which forms the outer dimensions of the shell.

9. The handle as claimed in claim 8, including at least one layer of resin-impregnated fiber-reinforced material extending substantially the entire axial length of the handle and an additional layer of resin impregnated reinforced material extending a limited portion of the axial length of the handle.

10. The handle as claimed in claim 8, wherein the veil layer comprises a polyester fabric.

11. The handle as claimed in claim 8, further including a coating layer covering the veil layer.

12. The handle as claimed in claim 1, wherein the material of outer shell and reinforcing fibers are selected so that the stiffness and yield strength of the shell is greater than that of the core.

13. The handle as claimed in claim 1, further comprising a bendable end portion integral with the shell, the bendable end portion being more bendable than the shell and adapted to fit within a handle socket of a tool.

14. The handle as claimed in claim 13, wherein said bendable end portion is configured such that a first and second series of projections extend generally normal to the length of the bendable end portion and wherein the first series of projections are alternately spaced with the second series of projections along the length of said end portion.

15. The handle as claimed in claim 1, wherein the shell has a substantially uniform cross-sectional thickness throughout its axial length.

16. An implement handle, comprising:

an axially elongated core member having an axial centerline and varying cross-sectional outer dimensions, said varying cross-sectional outer dimensions including several dimensional reversals comprising positive and negative changes in the outer dimensions; and an outer polymeric shell having axially-oriented substantially-continuous strength members, the outer shell fully enclosing and bonded to the core and being of substantially uniform thickness.

* * * * *